United States Patent [19]

Schwenzer

[11] Patent Number: 4,852,014

[45] Date of Patent: Jul. 25, 1989

[54] TRANSFER CONTROLLER MICROPROCESSOR

[75] Inventor: Alfred F. Schwenzer, Totowa, N.J.

[73] Assignee: New Jersey Machine Inc., Fairfield, N.J.

[21] Appl. No.: 127,938

[22] Filed: Dec. 2, 1987

[51] Int. Cl.⁴ .......................... G06G 7/48; B32B 31/10

[52] U.S. Cl. .......................................... 364/479; 221/9; 221/92; 222/1

[58] Field of Search ........................ 364/479, 200, 900; 221/9, 67, 68, 34, 92; 156/566, DIG. 12, DIG. 44, DIG. 25, 539, 549; 222/1

[56] References Cited

U.S. PATENT DOCUMENTS

| | | | |
|---|---|---|---|
| 3,779,829 | 12/1973 | Wolff | 156/DIG. 12 |
| 3,989,574 | 11/1976 | Evans | 156/DIG. 44 |
| 4,089,725 | 5/1978 | Crankshaw | 156/566 |
| 4,172,752 | 10/1979 | Robbins | 156/566 |
| 4,287,016 | 9/1981 | Kerwin et al. | 156/DIG. 25 |

*Primary Examiner*—Jerry Smith
*Assistant Examiner*—Paul Gordon
*Attorney, Agent, or Firm*—Charles E. Baxley

[57] ABSTRACT

A transfer microprocessor is programmed to monitor and control four label dispensers paired two each on either side of a flow of containers, with each side having an upstream and a downstream dispenser. Operation of a transfer function on either side between an on line and a standby mode is timed differently depending upon whether an upstream or a downstream dispenser is on line. A low web sensor is employed to generate signal to the transfer controller to initiate the transfer function. Upon command one of the on line dispensers is deactivated and its standby dispenser is activated to produce a continuous supply of labels to that side of the containers as they move past the label dispensers.

13 Claims, 7 Drawing Sheets

TRANSFER CONTROLLER MICROPROCESSOR

BACKGROUND OF THE INVENTION

1. Field of the Invention

The present invention relates to labeling machines and specifically to automatic labeling machines employing multiple label dispensers.

2. Description of the Prior Art

In an automatic labeling machine, labels on a roll are delivered from a label dispenser and adhered to containers automatically as the containers flow continuously past a labeling station. A problem occurs when the supply of labels is depleted in the dispenser, since the machine must then be shut down to reload a new roll of labels thus causing interruption in the labeling operation. Further, other failure conditions at the dispenser such as "Fail Safe" and "CPU Fail" render the dispenser inoperable thereby stopping the labeling operation. A second dispenser of labels mounted on the same side of the labeling machine can be provided and mounted so as to duplicate the operation of the first dispenser. This second dispenser is loaded with a supply of labels or otherwise serviced while the first dispenser is operating. When the first head becomes inoperative because it is out of labels or for other reasons, the second dispenser takes over. The reverse sequence may also occur in that the second dispenser is operative while the first dispenser is being serviced.

The need in such cases for accurate process control in such dual dispenser systems is apparent. The control complexity increases when a machine is constructed for applying two labels, one to the front and another to the back of a container simultaneously thus creating a system with four label dispensers (two for the front and two for the back) such that maximum throughput can be maintained as backup/transfer label dispensers are provided for both sides of the container.

SUMMARY OF THE INVENTION

The invention uses various control signals generated by the labeling machine and each of the dispensers to monitor operating condition of four dispensers and to control the sequence of operation to transfer the active role of one dispenser to another on a given side on a labeling machine in either an automatic or a manual mode. Each dispenser generates an "AVAILABLE" signal indicating that the dispenser is ready to function. The AVAILABLE signal must be present when the dispenser is ready to operate or is already actively operating by dispensing labels. The active dispenser is selected by the transfer controller by generating an "ENABLE" signal. Indicators are provided for an operator to view an "ON LINE" indication of the active dispenser and a "STAND BY" indication for the inactive but ready dispenser.

The active dispenser uses its supply of labels until it is nearly depleted. A "LOW WEB" sensor generates a control signal which initiates the transfer sequence to ensure a continuous supply of labels from the READY dispenser. On receipt of the LOW WEB control signal, the controller commands the active dispenser to dispense the next label. An indication is provided by the label sensor next to the dispenser that this next label was correctly registered. On receipt of this indication, the controller disables the active dispenser and enables the READY dispenser after a delay to account for the fact that a labelled container is already present between the two dispensers.

Other emergency conditions which would prevent the dispensing of the next label immediately start the transfer omitting the delay for the next container. The dispenser thus disabled can now be reloaded or otherwise made ready for service so that it will generate the AVAILABLE indication at the controller.

The transfer sequence of events is modified when the second head is the active dispenser because of the difference location of the labeled container. A manual override is provided so that the operator can initiate the transfer sequences when the standby dispenser is AVAILABLE.

The transfer controller of the present invention monitors the readiness of both dispensers and assures correct and orderly transfer of operation from one dispenser to the other. The invention controls four dispensers [two per side].

A microprocessor is programed in accordance with the detailed description below to monitor the operating conditions of the four dispensers and control the sequence of operation and transfer functions between dispensers for the front and back labels.

As will be discussed in detail below, operation of the transfer function between the two dispensers on a side of the container is different depending on whether the upstream or downstream dispenser is active.

In operation, if the active dispenser is the first or upstream dispenser, it uses its supply of labels until the supply is almost depleted. A LOW WEB sensor, known in the art, generates a signal to the controller of the invention to initiate the transfer sequence. The LOW WEB signal can appear at any time during the labeling cycle, therefore the controller commands the active dispenser to dispense the next label being requested by a container. When this label has been correctly registered by the label sensor of the dispenser, the controller removes the ENABLE signal at the dispenser thus causing it to stop dispensing labels. The dispenser controller removes the AVAILABLE signal to the controller of the invention. The controller then extinguishes the ON LINE indicators for that dispenser and commences the recognition of encoder pulses being transmitted from the moving conveying system. Upon a preset count of encoder pulses being reached (for the distances involved in one embodiment of the invention this number of pulses is 192 pulses), the downstream dispenser is enabled and commences dispensing labels to the next container requesting same. The controller also commands the status indicator to indicate that this downstream dispenser is ON LINE. The delay occasioned by the count is required because labeled containers are present between the upstream and the downstream dispensers.

A failure in the upstream dispensers such as "Fail Safe" or "CPU Fail" prevents the dispenser from dispensing any more labels so that the transfer is effected immediately without waiting for the proper register signal described above.

The upstream dispenser is now available for repair or reload and indicates is ready status by generating the AVAILABLE signal and indicating its status as STAND BY.

The sequence of events is different when the downstream dispenser is active and it is necessary to transfer to the upstream dispenser. In this condition, the containers between the two dispensers are not labelled. When a LOW WEB indication is generated by the downstream dispenser, the controller of the present invention immediately causes the upstream dispenser to be enabled so that both the upstream dispenser and the downstream dispenser are labelling each time their respective container sensors are triggered. In this sequence, the controller of the present invention accepts ENCODER pulses until 192 pulses are counted. The ENABLE signal is then removed from the downstream dispenser. The controller causes appropriate indications of the status of the dispensers to be displayed at the operator's station.

However, should the downstream dispenser become disabled because of a failure such as "Fail Safe" or "CPU Fail", the downstream dispenser will immediately disable and stop dispensing labels. This will result in the containers located between the dispensers to remain unlabeled as these units cannot be reached despite the fact that the upstream dispenser is commanded to immediately activate. Thus, it is desirable that the upstream dispenser remain active most of the time. To achieve that end, a manual transfer mode is provided to minimize the time that the downstream dispenser is active.

The principal object of the present invention is to provide for the automatic control of label dispensers and specifically to control the transfer from upstream to downstream dispensers and vice versa automatically.

A further object of the present invention is to provide a manual override of the automatic transfer function to ensure that an upstream label dispenser is active most of the time.

Another object of the invention is provide a delay time to take into account the containers between the upstream and downstream dispensers when an automatic transfer is initiated such that such containers are labelled.

Another object of the invention is to initiate the transfer between dispensers when the supply of labels on the active dispenser reaches a predetermined low level.

An additional object of the invention is to provide for initiation of the transfer function immediately on indication of failure of the active dispenser.

A still further object of the invention is to provide visual and audible indications at a control panel to enable the operator to monitor and control the status of the labelling dispensers.

Another object of the present invention is to control a labelling machine which labels the front and back of containers.

These as well as further objects and advantages of the invention will become apparent to those skilled in the art from a review of the detailed specification provided herein, reference being made to the accompanying drawings.

DETAILED DESCRIPTION OF THE INVENTION

Figure 1:
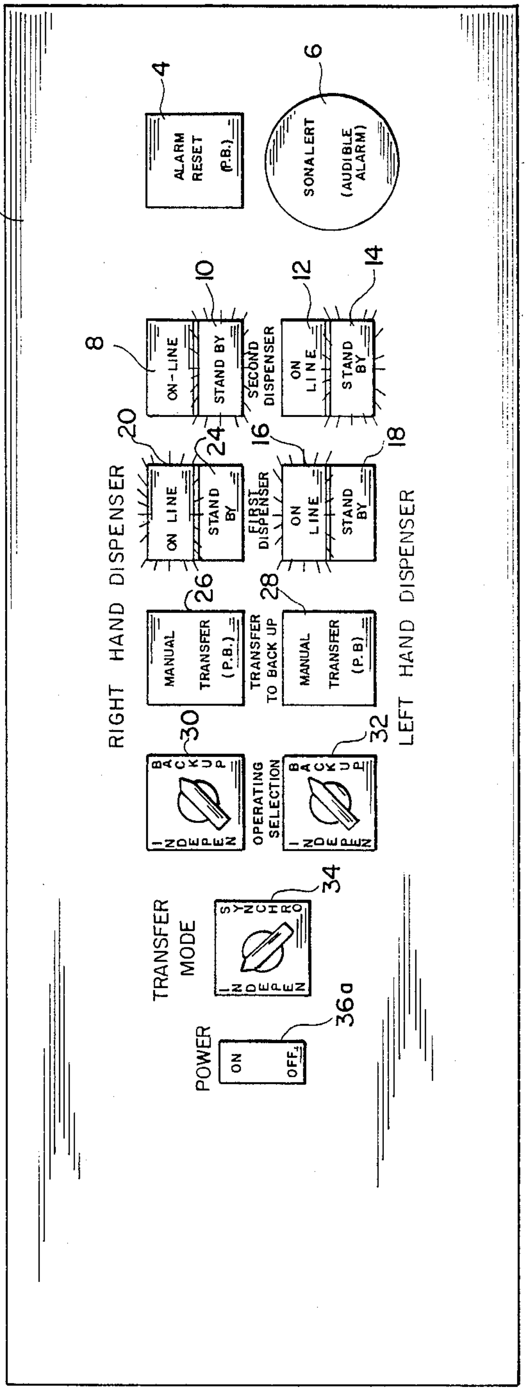
FIG. 1 is a front view of the control panel indications provided at the operator's control station.

FIG. 1 is a front view of the operator's control panel section which indicates and controls the operation of the automatic transfer controller of the present invention. This panel is designated by numeral 2 and has several indicating lights, control switches and pushbuttons mounted thereon. Numerals 4 and 6 designate an ALARM RESET switch and an each time an automatic transfer between dispensers is initiated. The switch 4 must be depressed to stop the alarm. A manual transfer between dispensers does not initiate an alarm.

Other indicators and controls on the operator's panel include (for the front and back labelling set, respectively), two ON-LINE/STAND-BY indicators 8,10 and 20,24 for the front dispenser set and 12,14 and 16,18 for the back dispenser set. Manual transfer switches 26 and 28 are also provided to initiate a manual transfer between dispensers. Further switches 30 and 32 are provided to control the operating mode for each set of dispensers to either backup or independent mode. Another switch 34 controls the entire system placing it in either the SYNCHRO or the INDEPENDENT mode. A power ON/OFF switch 36a is also provided.

Figure 2:
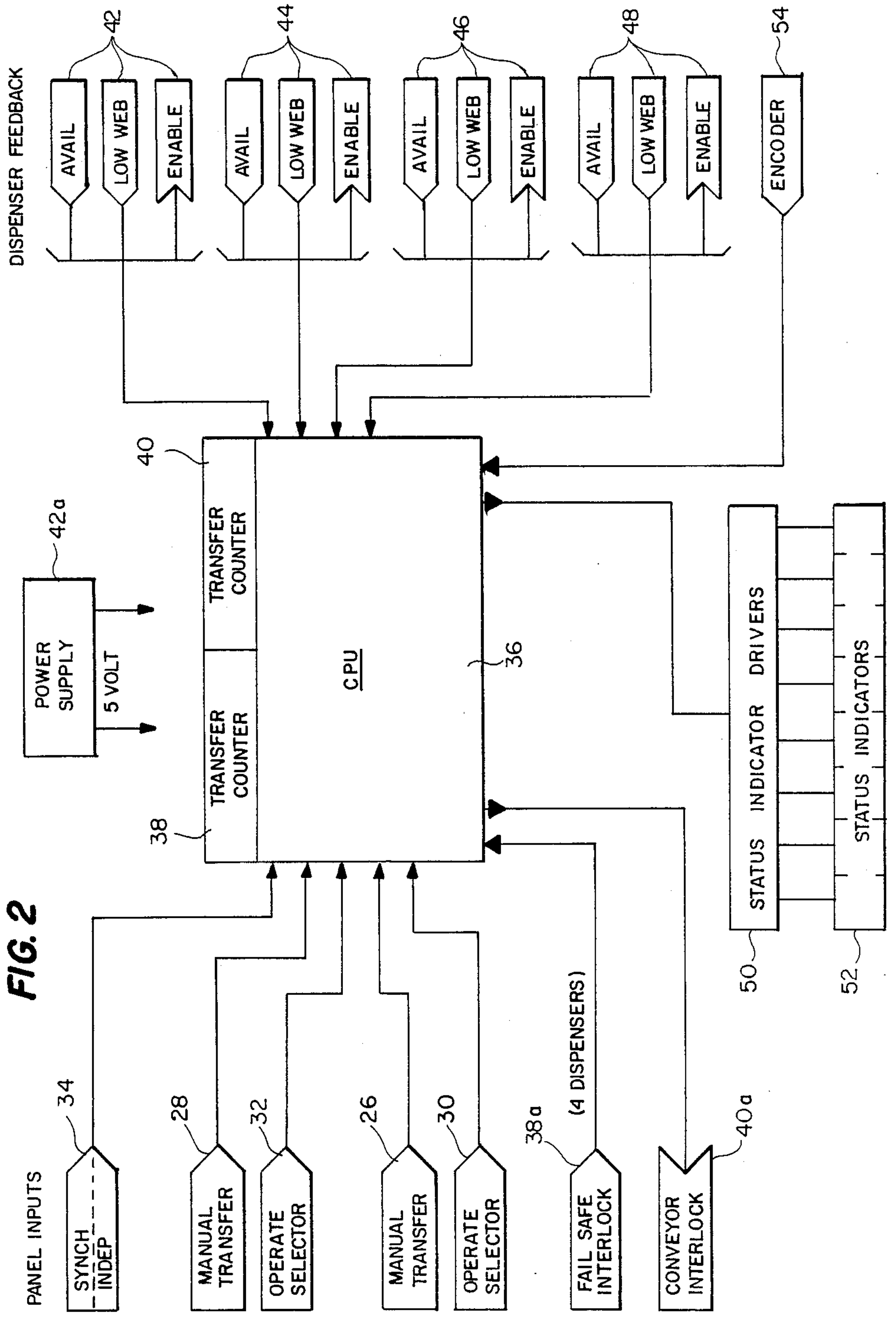
FIG. 2 is a block diagram of the functions performed by the controller of the present invention.
Figure 4A:
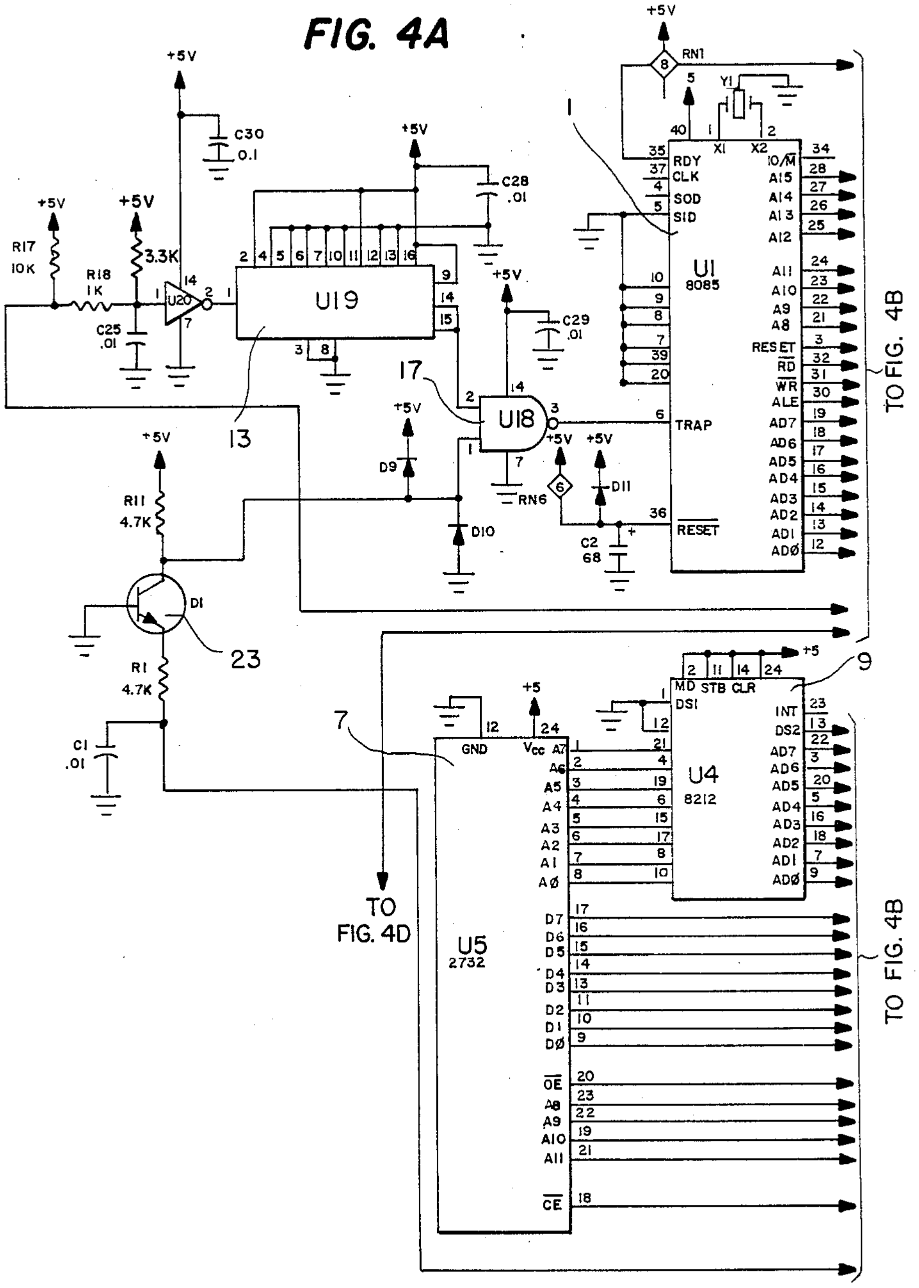
FIGS. 4A-4E are a schematic diagram of the controller of the invention.
Figure 4B:
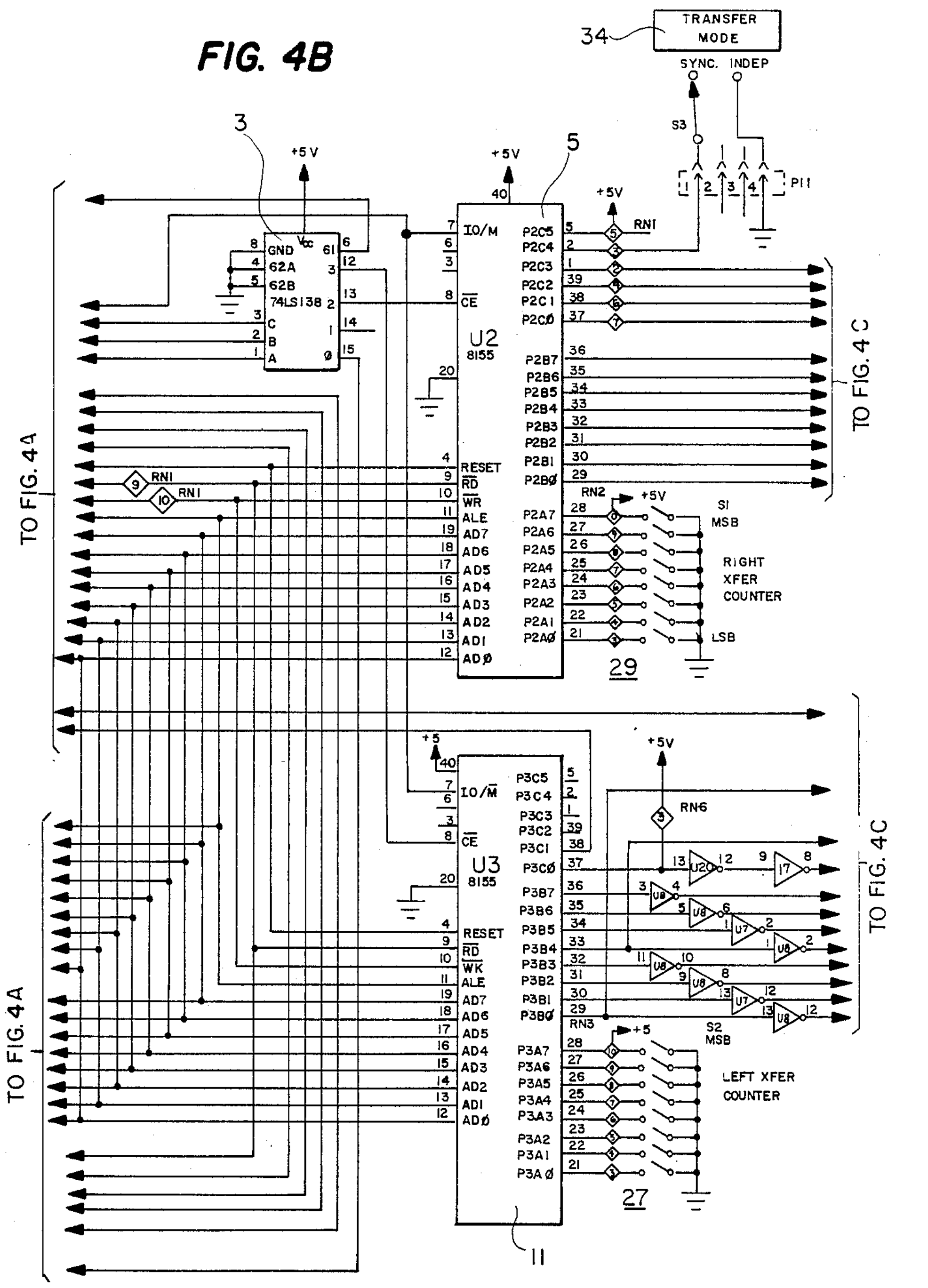
Figure 4C:
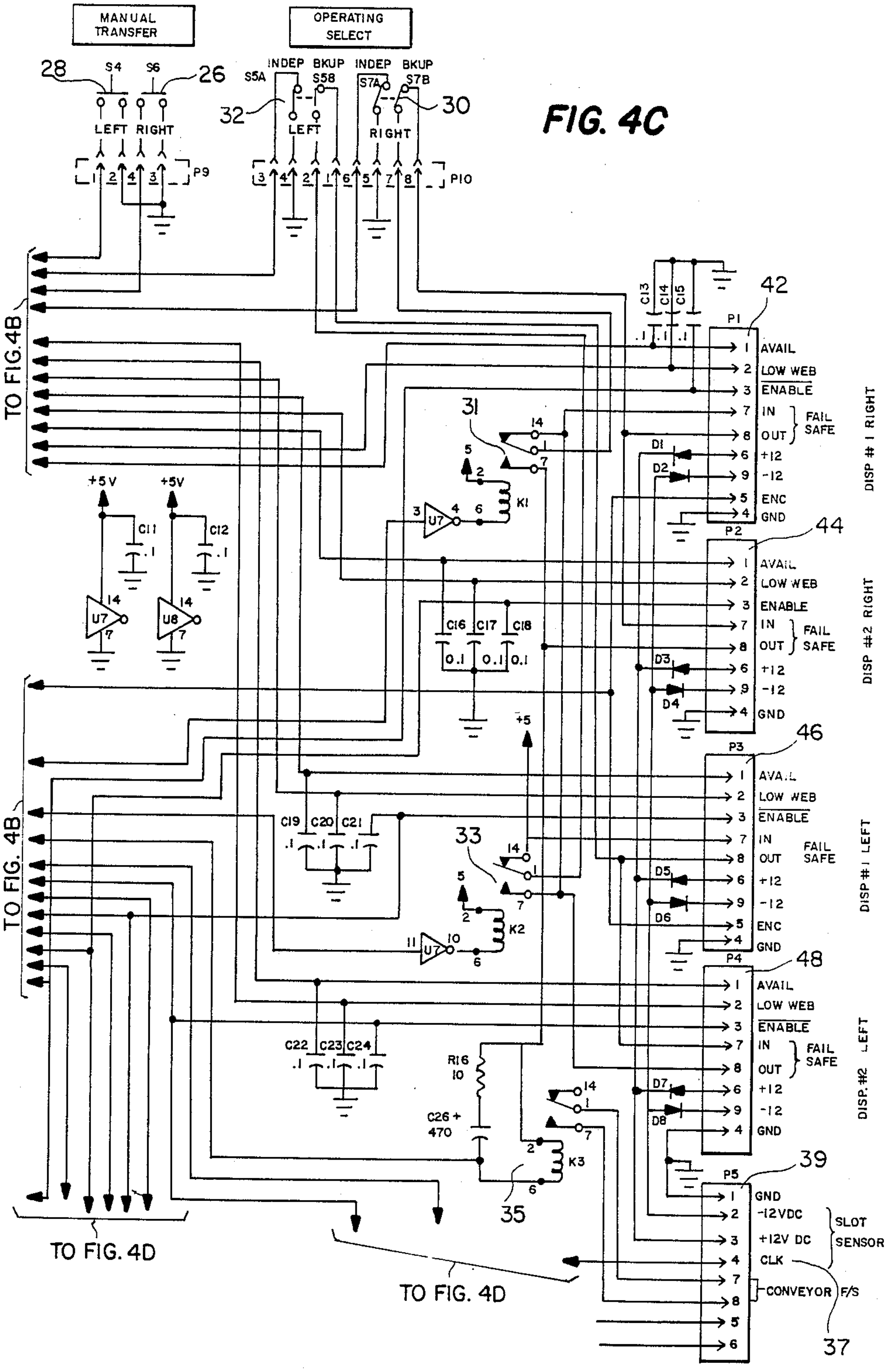
Figure 4D:
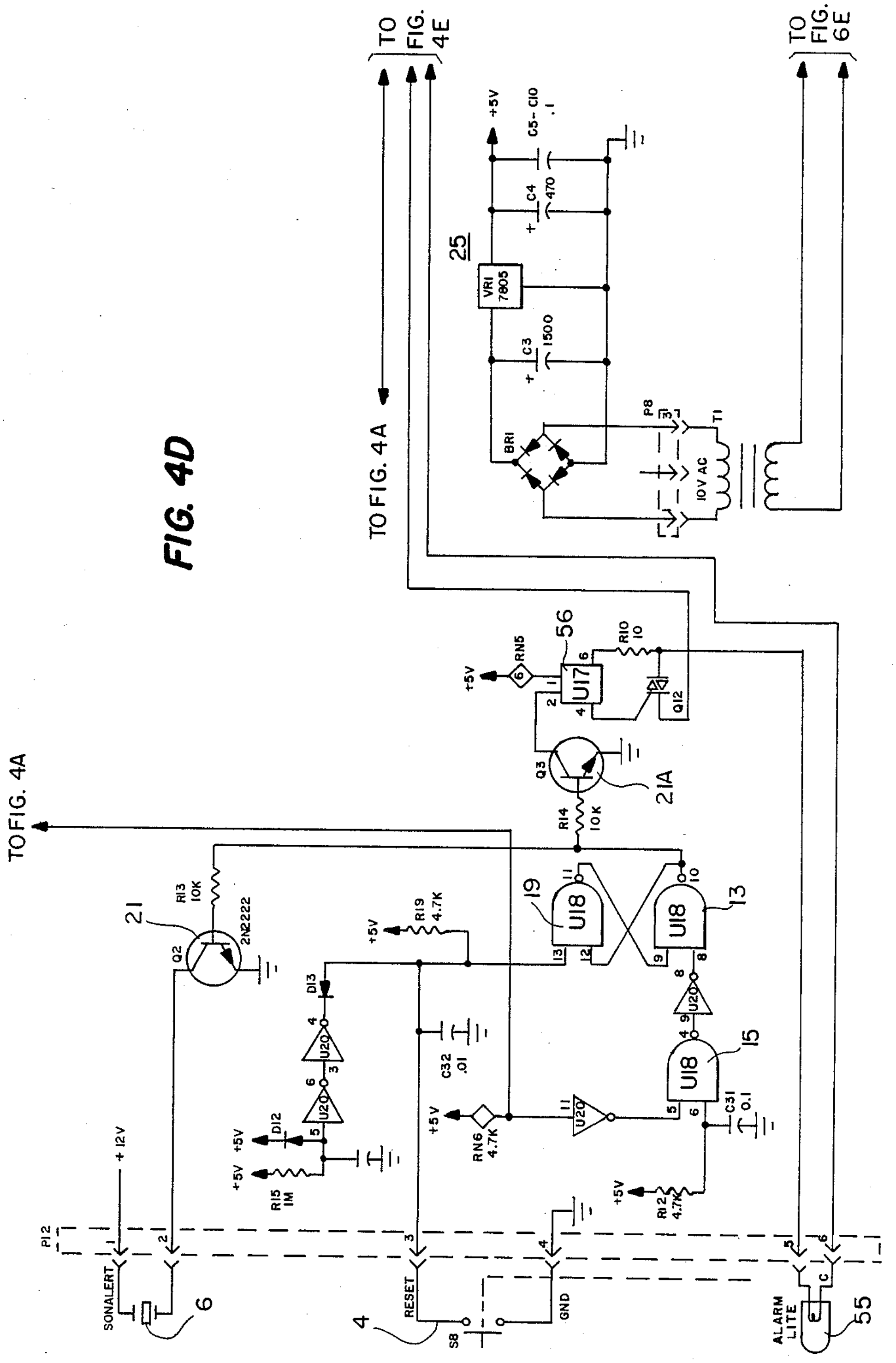
Figure 4E:
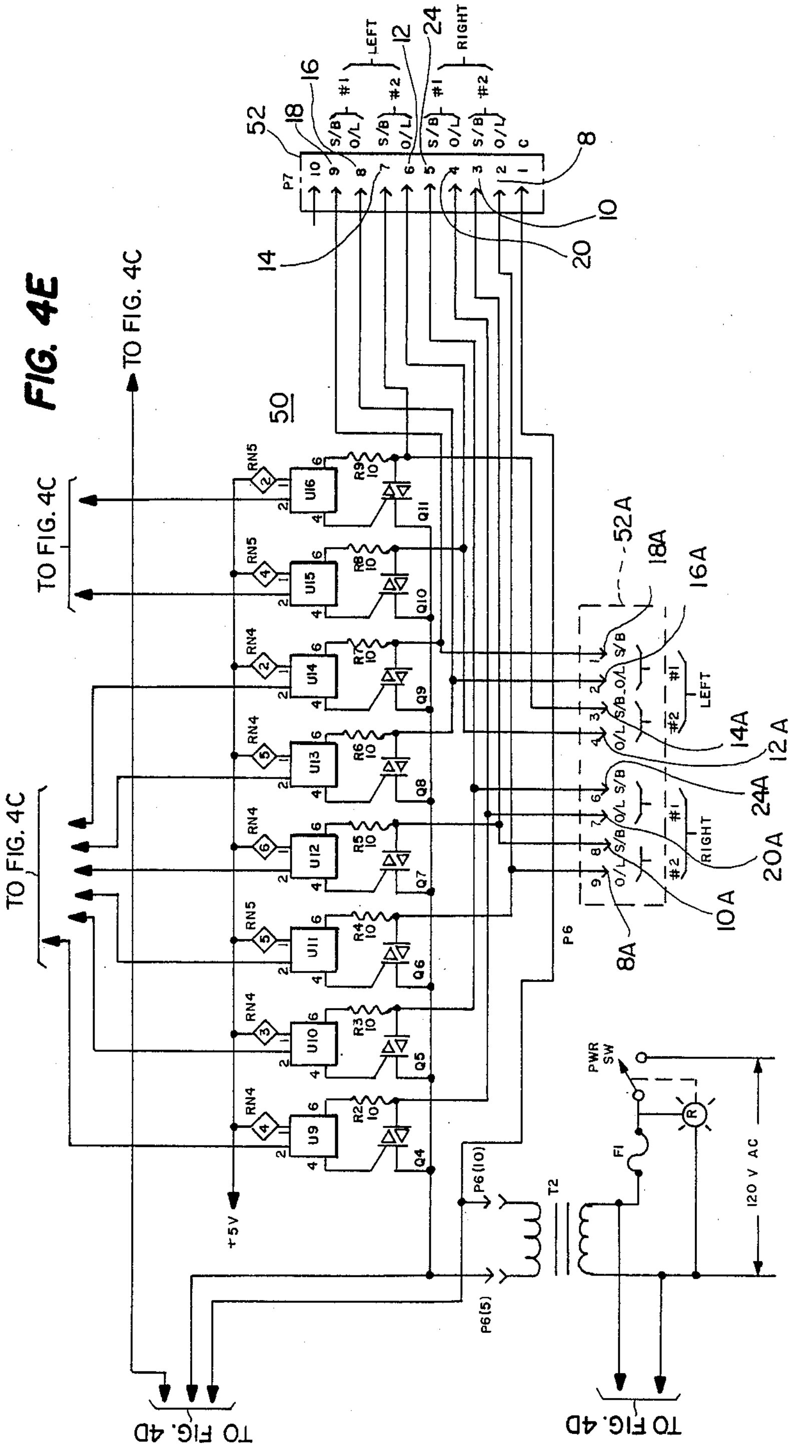

FIG. 2 is a block diagram showing the functions performed by the controller of the present invention. In FIG. 2, a CPU 36 is shown having transfer counters 38 and 40 as a part thereof. Counter 38 counts for one side of the dispenser set and counter 40 counts for the dispenser set on the other side of the labelling apparatus. A power supply 42a is shown for connection to the CPU 36 and to the remaining portions of the controller system. To the left hand side of FIG. 2 there are shown the panel inputs from the control panel described in connection with FIG. 1, above.

More specifically, connected to the CPU 36 is the panel control switch 34 for setting the system in either the SYNCHRO or the INDEPENDENT mode. Also connected to CPU 36 is the manual transfer and operator selector switches 28 and 32 for the left hand side dispensers and the manual transfer and operator selector switches 26 and 30 for the right hand side dispensers.

As will be further described in detail below, a fail safe interlock control 38a and a conveyor interlock 40a are coupled to and for the CPU 36, respectively. Status indicator drivers 50 for status indicators 52 are connected to received the appropriate status indications from CPU 36.

To the right hand side of FIG. 2, there is shown the various input functions connected to CPU 36 from the dispenser sets. Specifically, each dispenser 42, 44, 46, and 48 each have the capability of generating AVAILABLE and LOW WEB control signals for CPU 36. The CPU 36 generates the ENABLE signal for the appropriate dispenser as conditions demand. Lastly, an encoder 54 generates a number of pulses representative of the distance of travel of the containers between the dispensers during a transfer to account for the containers located between the two dispensers.

Figure 3:
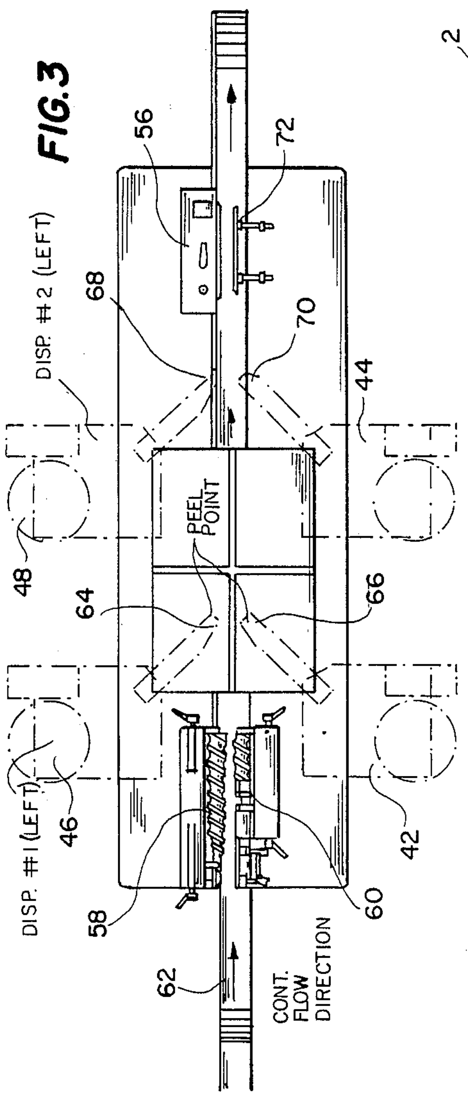
FIG. 3 is a top view of the labelling machine employing the controller for the labelling dispensers.

FIG. 3 is a diagrammatic top view of the dispenser portion of the apparatus which employs the controller of the present invention. In FIG. 3, the direction of flow of containers to be labeled is from left to right in the drawing so that the upper dispensers can be designated in the "left" dispensers and the lower dispensers in FIG. 3 are designated the "right" dispensers. The upper dispensers are shown at numerals 46 and 48 corresponding to the dispensing heads discussed in connection with FIG. 2. The dispenser 46 is the upstream dispenser and dispenser 48 is the downstream dispenser. The peel points for these dispensers are indicated at numerals 64 and 68, respectively. The lower dispensing set includes dispensers 42 and 44 again corresponding to the items similarly numbered in FIG. 2. Dispenser 42 is the upstream dispenser while dispenser 44 is the downstream dispenser. The peel poins of these later dispensers are designated 66 and 70, respectively.

A supply of containers flow to the peel points on conveyor 62 via feed screw systems 58, 60 for feeding and orienting the containers into the peel points of the dispenser. The units exit the peel points at a rolling pressure station 56, 72 to apply added pressure to ensure that the labels are securely applied to the containers.

FIGS. 4A–4E is a detailed schematic diagram of the digital electronic circuitry employed in the controller of this invention. Again, like numerals in FIG. 4. have been used to designate like parts from FIGS. 1–3. Thus, transfer mode switch 34 controlling the system from the SYNCHRO to the INDEPENDENT mode, described in connection with FIGS. 1–2, is shown connected to integrated circuit 5. Manual transfer and operating select pushbuttons 28 and 32 for the left hand dispensing set and 26 and 30 for the right hand dispensing set are also shown. The four label dispensers are shown on the right hand side of FIG. 4c at numerals 42, 44, 46 and 48. The various status indicating lamps (52 in FIG. 2, and 8, 10, 12, 14, 16, 18 20 and 24 in FIG. 1), are represented by a terminal connecting strip bearing these reference numerals, 52 and 52A on the back panel.

The main elements in the circuit are the integrated circuits 1, 3, 5, 7, 9, 11 and 13. These integrated circuits are commerical items available from several different suppliers and their model designations are given in the table of circuit elements given below. Integrated circuit 1 is connected to integrated circuits 3, 5, 7, 9 and 11 via the pin connections shown. Circuit 7 is connected to circuit 9, 11 and 5 via the connections described in the drawing. A transistor 23 is configured as a switch and is connected to circuit 1 via AND gate 17. Transistor 23 responds to a signal from the INPUT point 37 on terminal strip 39. An alternate signal from either ENC ports of the connectors 42 or 46 drives the AND gate 17 via circuit 13.

TRANSFER MODE switch 34 is connected to one input of integrated circuit 5. This switch 34 serves to ENABLE or DISABLE the synchronized automatic control functions of the invention. The MANUAL TRANSFER pushbuttons 26 and 28 are connected to the circuit 5 and to ground. Thus, depressing either or both of the MANUAL TRANSFER pushbuttons closes the circuit between the integrated circuit 5 and ground thus initiating the transfer sequence.

Three relays 31, 33 and 35 are provided. The relays 31 and 33 serve to control the connection between dispensers on each side of the labelling machine. Relay 35 drives the CONVEYOR FAIL SAFE signal. The coil of relay 35 and its associated delay circuit prevents a conveyor shut-down during the transfer time from dispenser 42 or 46 to dispenser 44 or 48. The fixed contacts of relay 31 are connected to dispenser 42, a fixed contact of relay 33, dispenser 48, dispenser 44, and relay 35. The moveable contact arm of relay 31 is connected to operating select switch 30. The fixed contacts of relay 33 are connected to dispenser 46, the 5V DC power supply, dispenser 48, and to a fixed contact of relay 31. The moveable contact arm of relay 33 is connected to operating select pushbutton 32. Each of the driving coils for the relays are connected to control outputs of integrated circuit 11. The coils of relays 31 and 32 are also connected to the 5V DC power supply.

The audible alarm 6 and alarm reset pushbutton 4 are also energized from circuit 11. AND gates 13, 15, and 19 are connected as shown to switching transistor 21 connected to the alarm, and switching transistor 21A to a driver circuit 56 to the alarm light 55. Another input to the alarm 6 is from the power supply. A reset pushbutton 4 is connected to gate 19 to reset and disable the audible alarm 6 and the alarm light 55.

The transfer counters 38 and 40 discussed in connection with FIG. 2, above are shown in detail at 27 and 29, respectively. The counter arrangement 27 corresponds to counter 38 in FIG. 2 and counts for dispensers 46 and 48. The counter 29 in FIG. 4B corresponds to the counter 40 of FIG. 2 and is connected to control dispensers 42 and 44.

The control outputs from circuit 11 is connected to status indicator drivers 50 which are, in turn, connected to the various status indication points on terminal strip 52 and 52A. Power of the status indicators and the drivers is supplied from power supply circuit 25.

The following table sets forth the model numbers and/or values of the elements of the circuit of FIGS. 4A–4E:

| | |
|---|---|
| U1 | IC 8085AH |
| U2,U3 | IC 8155 |
| U4 | IC 8212 |
| U5 | IC 2732A (EPROM) |
| U6 | IC 74LS138 |
| U7,U8 | IC 7416 |
| U9–U17 | IC MOC3011 |
| U18 | IC 4093 |
| U19 | IC 40102 |
| U20 | IC 40106 |
| D9–D13 | DIODE IN4148 |
| D1–D8 | DIODE IN4002 |
| C1, C25, C32 | CAPACITOR .01 MF, 50 V |
| C2 | CAPACITOR 68 MF, 15 V |
| C3 | CAPACITOR 1500 MF, 16 V |
| C4, C26 | CAPACITOR 470 MF, 35 V TANT |
| C5–C24, C28–C31 | CAPACITOR .1 MF, 50 V |
| C27 | CAPACITOR 1.0 MF |
| R15 | 1/4 W, 5%, 1 MEG |
| R13, R14, R17 | 1/4 W, 5%, 10K |
| R18 | 1/4 W, 5%, 1K |
| K1,2,3 | RELAY W172-DIP-5 |
| BR1 | MDA204 |
| R1, R11, R12, R19 | 1/4 W, 5% 4.7K |
| R2–R10, R16 | 1/4 W. 5% 10 ohm |
| RN1–RN3, RN6 | BOURNS SIP 4310R-101-472(4.7K) |
| RN4,RN5 | SIP F221X2P(220 ohm) |
| Q1–Q3 | 2N2222 |
| Q4–Q12 | T2800B |
| P1–P4 | CINCH CONN. TA 15P-5 |
| Y1 | ERIE MP061 |
| VR1 | MC7805CT |
| S1,S2 | DIP SWITCH AMP 3 435640-9 |
| S3,S5,S7 | A&B 800-MB HG2BBS |
| S4,S6 | A&B 800-MB-CA9A5 |
| T1 | SIGNAL ST4-10 |
| T2 | STANCOR P6466 |
| F1 | Fuse 3AG 1 AMP |
| DS1–DS4 | A&B 800-MB-DL06XXS |
| S8 | A&B 800-MB-CQA06RAS |

The circuit of FIGS. 4A–4E is operated from a central processing unit programmed in accordance with following:

```
        PORT NAMES:

PORT2   EQU     1       ; U2 COMMAND/STATUS
PORT2A  EQU     2       ; U2 PORT A
PORT2B  EQU     3       ; U2 PORT B
PORT2C  EQU     4       ; U2 PORT C
PORT2L  EQU     5       ; U2 TIMER LSB
PORT2M  EQU     6       ; U2 TIMER MSB & MODE

PORT3   EQU     7       ; U3 COMMAND/STATUS
PORT3A  EQU     8       ; U3 PORT A
PORT3B  EQU     9       ; U3 PORT B
PORT3C  EQU     10      ; U3 PORT C
PORT3L  EQU     11      ; U3 TIMER LSB
PORT3M  EQU     12      ; U3 TIMER MSB & MODE

;--------------------------------------------------
;       BIT NAMES:

; PORT2A - SHIFT COUNT, FRONT

; PORT2B
F1$AVAIL EQU    01H     ; FRONT DISP.#1 AVAILABLE
F1$LOWEB EQU    02H     ; FRONT DISP.#1 LOW WEB DET.
F2$AVAIL EQU    04H     ; FRONT DISP.#2 AVAILABLE
F2$LOWEB EQU    08H     ; FRONT DISP.#2 LOW WEB DET.
R1$AVAIL EQU    10H     ; REAR DISP.#1 AVAILABLE
R1$LOWEB EQU    20H     ; REAR DISP.#1 LOW WEB DET.
R2$AVAIL EQU    40H     ; REAR DISP.#2 AVAILABLE
R2$LOWEB EQU    80H     ; REAR DISP.#2 LOW WEB DET.

IS$LOWEB EQU    TRUE    ; POLARITY OF LOW WEB INPUTS
NO$LOWEB EQU    NOT IS$LOWEB
IS$AVAIL EQU    TRUE    ; POLARITY OF AVAILABLE INPUTS
NO$AVAIL EQU    NOT IS$AVAIL

; PORT 2C
F$MODE   EQU    01H     ; FRONT TRANSFER MODE
F$XFER   EQU    02H     ; FRONT TRANSFER BUTTON
R$MODE   EQU    04H     ; REAR TRANSFER MODE
R$XFER   EQU    08H     ; REAR TRANSFER BUTTON
NS$MD    EQU    10H     ; SYNC/IND MODE
;        EQU    20H

BK$MODE  EQU    FALSE   ; POLARITY OF TRANSFER MODE INPUTS
IN$MODE  EQU    NOT BK$MODE
DO$XFER  EQU    FALSE   ; POLARITY OF TRANSFER BUTTON INPUTS
NO$XFER  EQU    NOT DO$XFER
SYN$MD   EQU    FALSE   ; POLARITY OF SYNC.MODE INPUT
IND$MD   EQU    NOT SYN$MD

; PORT3A - SHIFT COUNT - REAR

; PORT3B
F1$ENABL EQU    01H     ; FRONT DISP.#1 ENABLE
F1$STBY  EQU    02H     ; FRONT DISP.#1 STANDBY
F2$ENABL EQU    04H     ; FRONT DISP.#2 ENABLE
F2$STBY  EQU    08H     ; FRONT DISP.#2 STANDBY
R1$ENABL EQU    10H     ; REAR DISP.#1 ENABLE
R1$STBY  EQU    20H     ; REAR DISP.#1 STANDBY
R2$ENABL EQU    40H     ; REAR DISP.#2 ENABLE
R2$STBY  EQU    80H     ; REAR DISP.#2 STANDBY

; PORT3C
FAIL     EQU    01H     ; FORCE FAIL-SAFE
ALARM    EQU    02H     ; TRIGGER FOR TRANSFER ALARM
```

```
;       EQU     04H
;       EQU     08H
;       EQU     10H
;       EQU     20H

;-----------------------------------------------
; INTERRUPT VECTORS

        ORG     0000H

        JMP     INIT
        DW      CHKSUM
        DB      0,0,0

        JMP     RST1
        DB      0,0,0,0,0

        JMP     RST2
        DB      0,0,0,0,0

        JMP     RST3
        DB      0,0,0,0,0

        JMP     RST4
        DB      0

        JMP     MAIN
        DB      0

        JMP     RST5
        DB      0

        JMP     RST5$5
        DB      0

        JMP     RST6
        DB      0

        JMP     RST6$5
        DB      0

        JMP     RST7
        DB      0

        JMP     RST7$5

;-----------------------------------------------

INIT:
        DI
        LXI     SP,STACK

        LXI     H,U2RAM         ; ZERO MAIN RAM
INIT1:
        MVI     M,0
        INR     L
        JNZ     INIT1

        LXI     H,U3RAM         ; ZERO SHIFT-REGISTER RAM ALSO
INIT2:
        MVI     M,0
        INR     L
        JNZ     INIT2

        LXI     H,PORT2         ; INITIALIZE 8155 PORTS
        MVI     A,040H          ; A,B,C = INPUT
```

```
CALL    OUTP
LXI     H,PORT3
MVI     A,04EH          ; A = INPUT; B,C = OUTPUT
CALL    OUTP

MVI     A,1FH           ; MAKE SURE RSTn.5's ARE ENABLED, 7.5 CLEARED
DB      30H ; SIM INSTRUCTION
EI                      ; ENABLE INTERRUPTS

;------------------------------------------------
BACKGND:
        LXI     SP,STACK

        LXI     H,PORT2C        ; CHECK FRONT DISPENSER SWITCHES
        CALL    INP
 IF BK$MODE AND NO$XFER
        XRI     F$MODE+R$MODE
 ENDIF
 IF IN$MODE AND DO$XFER
        XRI     F$XFER+R$XFER
 ENDIF
 IF BK$MODE AND DO$XFER
        XRI     F$MODE+R$MODE+F$XFER+R$XFER
 ENDIF
        PUSH    PSW             ; SAVE FOR REAR CHECK
        ANI     F$MODE          ; IS IT BACKUP?
        JZ      BKGND1          ; YES

        LXI     H,PORT2B        ; NO - SELECT BOTH IF NOT LOW WEB
        CALL    INP
 IF NO$LOWEB
        XRI     F1$LOWEB+F2$LOWEB
 ENDIF
        PUSH    PSW
        ANI     F1$LOWEB
        ADI     0FFH
        SBB     A               ; 00 IF LOW WEB = 0
        STA     F$SEL1
        POP     PSW
        ANI     F2$LOWEB
        SUI     1
        SBB     A               ; FF IF LOW WEB = 0
        STA     F$SEL2

BKGND1:
        POP     PSW
        PUSH    PSW
        ANI     F$MODE+F$XFER   ; IS IT BACKUP & XFER BUTTON PUSHED?
        CZ      MAN$FRNT        ; YES - DO TRANSFER

;-------

        POP     PSW             ; CHECK REAR DISP. SW'S
        PUSH    PSW
        ANI     R$MODE          ; IS IT BACKUP?
        JZ      BKGND2          ; YES

        LXI     H,PORT2B        ; NO - SELECT BOTH IF NOT LOW WEB
        CALL    INP
 IF NO$LOWEB
        XRI     R1$LOWEB+R2$LOWEB
 ENDIF
        PUSH    PSW
        ANI     R1$LOWEB
        ADI     0FFH
        SBB     A
```

```
        STA     R$SEL1
        POP     PSW
        ANI     R2$LOWEB
        SUI     1
        SBB     A
        STA     R$SEL2

BKGND2:
        POP     PSW
        ANI     R$MODE+R$XFER     ; BACKUP & XFER?
        CZ      MAN$REAR          ; YES - DO IT

;---------------------------------------------------
        LXI     H,PORT2C
        CALL    INP
 IF BK$MODE
        XRI     F$MODE+R$MODE
 ENDIF
        MOV     C,A

        LXI     H,PORT2B
        CALL    INP
 IF IS$AVAIL AND IS$LOWEB
        XRI     F1$AVAIL+F2$AVAIL+R1$AVAIL+R2$AVAIL
 ENDIF
 IF NO$AVAIL AND NO$LOWEB
        XRI     F1$LOWEB+F2$LOWEB+R1$LOWEB+R2$LOWEB
 ENDIF
 IF IS$AVAIL AND NO$LOWEB
        CMA
 ENDIF
        MOV     B,A
        MVI     A,F$MODE
        ANA     C
        MVI     A,F1$LOWEB+F2$LOWEB
        JNZ     FAIL1

        MVI     A,F1$AVAIL+F1$LOWEB
        ANA     B
        JZ      FAIL2

        MVI     A,F2$AVAIL+F2$LOWEB

FAIL1:
        ANA     B
        JNZ     FAIL4

FAIL2:
        MVI     A,R$MODE
        ANA     C
        MVI     A,R1$LOWEB+R2$LOWEB
        JNZ     FAIL3

        MVI     A,R1$AVAIL+R1$LOWEB
        ANA     B
        JZ      FAIL5

        MVI     A,R2$AVAIL+R2$LOWEB

FAIL3:
        ANA     B
        JZ      FAIL5

FAIL4:
        MVI     A,FAIL
```

```
FAIL5:
        MVI     B,FAIL
        LXI     H,PORT3C
        CALL    BITOUT

        CALL    BKGNDOUT
        JMP     BACKGND
;-----------------------------------------------------

BKGNDOUT:
        LXI     H,PORT2B        ; FRONT DISPENSER #1 OUTPUTS
        CALL    INP
IF NO$LOWEB
        XRI     F1$LOWEB+F2$LOWEB+R1$LOWEB+R2$LOWEB
ENDIF
        PUSH    PSW
        MOV     B,A
        ANI     F1$AVAIL        ; IS IT READY TO RUN?
IF IS$AVAIL
        JZ      BKGND3          ; NO
ENDIF
IF NO$AVAIL
        JNZ     BKGND3          ; NO
ENDIF

        MOV     A,B
        ANI     F1$LOWEB
        SUI     1
        SBB     A               ; 00 IF LOW WEB, FF IF NOT
        ORI     F1$ENABL
        MOV     B,A

        LDA     F$SEL1          ; IS IT SELECTED?
        XRI     F1$ENABL        ; IF SO, TURN ON "ENABLE"
        ANA     B               ; TURN "STANDBY" OFF IF LOW WEB

BKGND3:
        MVI     B,F1$ENABL+F1$STBY
        LXI     H,PORT3B
        CALL    BITOUT

;-------

        POP     PSW             ; FRONT DISPENSER #2 OUTPUTS
        PUSH    PSW
        MOV     B,A
        ANI     F2$AVAIL        ; IS IT READY TO RUN?
IF IS$AVAIL
        JZ      BKGND4          ; NO
ENDIF
IF NO$AVAIL
        JNZ     BKGND4          ; NO
ENDIF

        MOV     A,B
        ANI     F2$LOWEB
        SUI     1
        SBB     A               ; 00 IF LOW WEB, FF IF NOT
        ORI     F2$ENABL
        MOV     B,A

        LDA     F$SEL2          ; IS IT SELECTED?
        XRI     F2$STBY         ; IF SO, TURN OFF "STANDBY"
        ANA     B               ; TURN "STANDBY" OFF IF LOW WEB

BKGND4:
```

```
        MVI     B,F2$ENABL+F2$STBY
        LXI     H,PORT3B
        CALL    BITOUT
;-------

        POP     PSW             ; REAR DISPENSER #1 OUTPUTS
        PUSH    PSW
        MOV     B,A
        ANI     R1$AVAIL        ; IS IT READY TO RUN?
    IF IS$AVAIL
        JZ      BKGND5          ; NO
    ENDIF
    IF NO$AVAIL
        JNZ     BKGND5          ; NO
    ENDIF

        MOV     A,B
        ANI     R1$LOWEB
        SUI     1
        SBB     A               ; 00 IF LOW WEB, FF IF NOT
        ORI     R1$ENABL
        MOV     B,A

        LDA     R$SEL1          ; IS IT SELECTED?
        XRI     R1$ENABL        ; IF SO, TURN ON "ENABLE"
        ANA     B               ; TURN "STANDBY" OFF IF LOW WEB

BKGND5:
        MVI     B,R1$ENABL+R1$STBY
        LXI     H,PORT3B
        CALL    BITOUT

;-------

        POP     PSW             ; REAR DISPENSER #2 OUTPUTS
        MOV     B,A
        ANI     R2$AVAIL        ; IS IT READY TO RUN?
    IF IS$AVAIL
        JZ      BKGND6          ; NO
    ENDIF
    IF NO$AVAIL
        JNZ     BKGND6          ; NO
    ENDIF

        MOV     A,B
        ANI     R2$LOWEB
        SUI     1
        SBB     A               ; 00 IF LOW WEB, FF IF NOT
        ORI     R2$ENABL
        MOV     B,A

        LDA     R$SEL2          ; IS IT SELECTED?
        XRI     R2$STBY         ; IF SO, TURN OFF "STANDBY"
        ANA     B               ; TURN "STANDBY" OFF IF LOW WEB

BKGND6:
        MVI     B,R2$ENABL+R2$STBY
        LXI     H,PORT3B
        CALL    BITOUT

        LXI     H,ALRMFLG       ; CHECK FOR ALARM
        MOV     A,M
        MVI     M,0             ; CLEAR FLAG
        MVI     B,ALARM
        LXI     H,PORT3C
        JMP     BITOUT          ; OUTPUT ALARM BIT AND RETURN
```

```
MAN$FRNT:
        LXI     H,50                    ; DEBOUNCE
        CALL    DELAY
        LXI     H,PORT2C                ; CHECK IF STILL PUSHED
        CALL    INP
        ANI     F$XFER
        RNZ                             ; NOPE - EXIT

        LDA     F$SEL1                  ; GET CURRENT SELECTION
        CMA                             ; REVERSE IT
        CALL    SEL$F                   ; TRY TO SELECT
        JNZ     MAN$F1                  ; IF CAN'T, QUIT

        STA     SEL                     ; SAVE FOR LATER IF SYNC. MODE
        LXI     H,PORT2C                ; CHECK IF SYNC. TRANSFER MODE
        CALL    INP
        ANI     NS$MD
 IF IND$MD
        JNZ     MAN$F1                  ; NO - QUIT
 ENDIF
 IF SYN$MD
        JZ      MAN$F1                  ; NO - QUIT
 ENDIF

        LDA     SEL                     ; TRY TO TRANSFER OTHER SIDE
        CALL    SEL$R

MAN$F1:
        CALL    BKGNDOUT
        LXI     H,PORT2C                ; WAIT FOR BUTTON RELEASED
        CALL    INP
        ANI     F$XFER
        JZ      MAN$F1

        LXI     H,50 ;MS.               ; DEBOUNCE
        JMP     DELAY                   ;   AND RETURN

;-----------------------------------------------

MAN$REAR:
        LXI     H,50 ;MS.               ; DEBOUNCE
        CALL    DELAY
        LXI     H,PORT2C                ; CHECK IF STILL PUSHED
        CALL    INP
        ANI     R$XFER
        RNZ                             ; NOPE - EXIT

        LDA     R$SEL1                  ; GET CURRENT SELECTION
        CMA                             ; REVERSE IT
        CALL    SEL$R                   ; TRY TO SELECT
        JNZ     MAN$R1                  ; IF CAN'T, QUIT

        STA     SEL                     ; SAVE FOR LATER IF SYNC. MODE
        LXI     H,PORT2C                ; CHECK IF SYNC. TRANSFER MODE
        CALL    INP
        ANI     NS$MD
 IF IND$MD
        JNZ     MAN$R1                  ; NO - QUIT
 ENDIF
 IF SYN$MD
        JZ      MAN$R1                  ; NO - QUIT
 ENDIF

        LDA     SEL                     ; TRY TO TRANSFER OTHER SIDE
        CALL    SEL$F
```

```
MAN$R1:
        CALL    BKGNDOUT
        LXI     H,PORT2C            ; WAIT FOR BUTTON RELEASED
        CALL    INP
        ANI     R$XFER
        JZ      MAN$R1

        LXI     H,50 ;MS.           ; DEBOUNCE
        JMP     DELAY               ;   AND RETURN
;-------------------------------------------

MAIN:
        PUSH    H
        PUSH    D
        PUSH    B
        PUSH    PSW

        LXI     H,PORT2C            ; IS FRONT MODE "INDEPENDENT"?
        CALL    INP
 IF BK$MODE AND IND$MD
        XRI     F$MODE+R$MODE
 ENDIF
 IF IN$MODE AND SYN$MD
        XRI     NS$MD
 ENDIF
 IF BK$MODE AND SYN$MD
        XRI     NS$MD+F$MODE+R$MODE
 ENDIF
        PUSH    PSW
        ANI     F$MODE
        JNZ     MAIN1               ; YES - SKIP

        LDA     F$SEL1              ; WHICH IS CURRENTLY SELECTED?
        CALL    SEL$F               ; TRY TO RESELECT IT
        JZ      MAIN1               ; OK - CONTINUE

        CMA                         ; NO GOOD - REVERSE SELECTION
        CALL    SEL$F
        JNZ     MAIN1               ; STILL NO GOOD

        STA     SEL                 ; OK, SAVE FOR SYNC. TRANSFER
        MVI     A,ALARM
        STA     ALRMFLG             ; SET ALARM

MAIN1:
        POP     PSW                 ; IS REAR MODE "INDEPENDENT"?
        PUSH    PSW
        ANI     R$MODE
        JNZ     MAIN2               ; YES - SKIP

        LDA     R$SEL1              ; WHICH IS CURRENTLY SELECTED?
        CALL    SEL$R               ; TRY TO RESELECT IT
        JZ      MAIN2               ; OK - CONTINUE

        CMA                         ; NO GOOD - REVERSE SELECTION
        CALL    SEL$R
        JNZ     MAIN2               ; STILL NO GOOD

        STA     SEL                 ; OK, SAVE FOR SYNC. TRANSFER
        MVI     A,ALARM
        STA     ALRMFLG             ; SET ALARM

MAIN2:
        POP     PSW                 ; SYNC. MODE AND BOTH SIDES IN BACKUP?
        PUSH    PSW
```

```
         ANI     NS$MD+F$MODE+R$MODE
         JNZ     MAIN3             ; NO, SKIP

         LDA     SEL               ; YES - TRY TO COMPLETE SYNC. XFER. (IF ANY)
         CALL    SEL$F
         CALL    SEL$R
MAIN3:
         LXI     H,SCL$CNT
         DCR     M
         JP      MAIN5

         MVI     M,SCALE

         POP     PSW               ; IS FRONT MODE "INDEPENDENT"?
         PUSH    PSW
         ANI     F$MODE
         JNZ     MAIN4             ; YES - SKIP

         LXI     H,PORT2A          ; SHIFT FRONT SELECTION
         CALL    INP
         MOV     C,A               ; SHIFT COUNT
         MVI     B,255             ; MAX SHIFT
         LDA     F$SEL1
         LXI     D,FRNT$SR
         LXI     H,F$SRINX
         CALL    SHIFT
         STA     F$SEL2

MAIN4:
         POP     PSW               ; IS REAR MODE "INDEPENDENT"?
         PUSH    PSW
         ANI     R$MODE
         JNZ     MAIN5             ; YES - SKIP

         LXI     H,PORT3A          ; SHIFT REAR SELECTION
         CALL    INP
         MOV     C,A               ; SHIFT COUNT
         MVI     B,255             ; MAX SHIFT
         LDA     R$SEL1
         LXI     D,REAR$SR
         LXI     H,R$SRINX
         CALL    SHIFT
         STA     R$SEL2

MAIN5:
         POP     PSW
 IF SYNC2
         ANI     NS$MD+F$MODE+R$MODE ; SYNC. MODE AND BOTH SIDES IN BACKUP?
         JNZ     MAIN6             ; NO, SKIP

         LXI     H,PORT2B          ; GET DISP. STATUS
         CALL    INP
  IF IS$AVAIL
         XRI     F1$AVAIL+F2$AVAIL
  ENDIF
         ANI     F2$AVAIL+R2$AVAIL ; IS 2ND HEAD NOT AVAIL?
         JZ      MAIN6             ; SKIP IF 2ND HEADS AVAIL.

         XRA     A
         STA     F$SEL2            ; DESELECT BOTH #2 DISPENSERS NOW
         STA     R$SEL2

MAIN6:
 ENDIF ;SYNC2
         POP     PSW
         POP     B
```

```
        POP     D
        POP     H
        EI
        RET
;-----------------------------------------------

SEL$F:
        MVI     B,F2$AVAIL+F2$LOWEB
        MVI     C,F1$AVAIL+F1$LOWEB
        CALL    SEL$01
        RNZ                     ; RETURN IF NOT READY

        STA     F$SEL1          ; ELSE DO SELECTION
        RET
;-----------------------------------------------

SEL$R:
        MVI     B,R2$AVAIL+R2$LOWEB
        MVI     C,R1$AVAIL+R1$LOWEB
        CALL    SEL$01
        RNZ                     ; RETURN IF NOT READY

        STA     R$SEL1          ; ELSE DO SELECTION
        RET

;-----------------------------------------------

SEL$01:
        ORA     A               ; WHICH IS IT?
        JZ      SEL$02          ; IS '1'

        MOV     C,B

SEL$02:
        MOV     B,A             ; SAVE ARG.
        LXI     H,PORT2B        ; GET DISP. STATUS
        CALL    INP
 IF IS$AVAIL AND IS$LOWEB
        XRI     F1$AVAIL+F2$AVAIL
 ENDIF
 IF NO$AVAIL AND NO$LOWEB
        XRI     F1$LOWEB+F2$LOWEB
 ENDIF
 IF IS$AVAIL AND NO$LOWEB
        XRI     F1$AVAIL+F2$AVAIL+F1$LOWEB+F2$LOWEB
 ENDIF
        ANA     C               ; TEST IT - NZ IF NOT READY
        MOV     A,B             ; GET BACK ARG.
        RET
;-----------------------------------------------

; SHIFT - SIMULATE SHIFT REGISTER
; CALL:         A = INPUT TO REGISTER (0 OR NOT 0)
;               B = (MAX LENGTH OF REG)-1; MUST BE POWER OF 2
;               C = DESIRED DELAY
;               DE = POINTER TO START OF REGISTER IN RAM
;               HL = POINTER TO COUNTER BYTE IN RAM
; RETURN:       A = 00 OR FF
; USES:         ALL

SHIFT:
        ADI     0FFH
        SBB     A       ; A=00 OR FF
        PUSH    PSW     ; SAVE "WRITE" DATA
        MOV     A,M     ; OLD "WRITE" INDEX
        INR     A
```

```
        ANA     B
        MOV     M,A     ; NEW "WRITE" INDEX
        PUSH    PSW     ; SAVE IT
        SUB     C
        ANA     B       ; "READ" INDEX
        CALL    SHSUB   ; A=MASK BIT; HL=POINTER TO BYTE
        ANA     M       ; "READ" DATA
        POP     H       ; H="WRITE" INDEX
        POP     B       ; B="WRITE" DATA
        PUSH    PSW     ; SAVE "READ" DATA
        MOV     A,H
        CALL    SHSUB   ; A=MASK BIT; HL=POINTER TO BYTE
        MOV     C,A
        MOV     A,B
        XRA     M
        ANA     C
        XRA     M       ; NEW VALUE FOR BYTE
        MOV     M,A     ; SAVE IT
        POP     PSW     ; GET BACK "READ" DATA
        RZ              ; RETURN IF ZERO

        MVI     A,OFFH  ; ELSE RETURN FF
        RET

;---------------------------------------------

SHSUB:
        MOV     L,A     ; SAVE INDEX
        ANI     7       ; BIT IN BYTE
        INR     A       ;       1-8
        MOV     H,A     ; USE H AS COUNTER
        MOV     A,L     ; GET BACK INDEX
        ANI     OF8H    ; CLEAR BIT #
        RRC             ;   AND DIVIDE BY 8
        RRC
        RRC
        MOV     L,A     ; SAVE BYTE-IN-ARRAY
        MVI     A,80H   ; INIT BIT-IN-BYTE

SHSUB1:
        RLC             ; SHIFT BIT
        DCR     H
        JNZ     SHSUB1  ; DONE WHEN H=0

        DAD     D       ; POINTER TO BYTE
        RET
;---------------------   ---------------------

; DELAY - DELAY SPECIFIED NO. OF MILLISECONDS
; CALL:         HL = DESIRED DELAY
; RETURN:       NONE
; USES:         A,F,H,L
DELAY:
        MOV     A,H
        ORA     L
        RZ

        DCX     H
        PUSH    D
        LXI     D,41*CLOCK

DELAY1:
        MOV     A,D
        ORA     E
        DCX     D
        JNZ     DELAY1
```

```
        POP     D
        JMP     DELAY

;-----------------------------------------------

; INP - INPUT FROM A PORT
; CALL:         HL = PORT CODE
; RETURN:       A = VALUE
; USES:         NONE
INP:
        PUSH    H
        CALL    PORTXLAT
        MOV     A,M
        POP     H
        RET

;-----------------------------------------------

; BITOUT - OUTPUT ONE OR MORE BITS TO A PORT
; CALL:         A = VALUE, B = MASK, HL = PORT CODE
; RETURN:        A = OUTPUT BYTE
; USES:         CARRY CLEARED
BITOUT:
        PUSH    D
        XCHG
        LXI     H,OUTSAVE-1
        DAD     D
        XRA     M
        ANA     B
        XRA     M
        XCHG
        POP     D
;       JMP     OUTP

;-----------------------------------------------

; OUTP - OUTPUT TO A PORT
; CALL:         A = VALUE, HL = PORT CODE
; RETURN:       NONE
; USES:         CARRY CLEARED
OUTP:
        PUSH    H
        CALL    PORTXLAT
        MOV     M,A
        XCHG
        XTHL
        LXI     D,OUTSAVE-1
        DAD     D
        MOV     M,A
        POP     H
        XCHG
        RET
;-----------------------------------------------

PORTXLAT:                       ; TRANSLATE A PORT CODE IN HL TO ADDRESS
        PUSH    D
        DAD     H
        LXI     D,PORTTABL-2
        DAD     D               ; POINTER INTO PORTTABL
        MOV     E,M
        INX     H
        MOV     D,M
        XCHG                    ; HL = VALUE FROM TABLE
        POP     D
        RET

;-----------------------------------------------
```

```
CDEHL:                          ; COMPARE DE AND HL
        MOV     A,D
        CMP     H
        RNZ

        MOV     A,E
        CMP     L
        RET

;----------------------------------------

RST1:
        EI
        RET

;----------------------------------------

RST2:
        EI
        RET

;----------------------------------------

RST3:
        EI
        RET

;----------------------------------------

RST4:
        EI
        RET

;----------------------------------------

RST5:
        EI
        RET

;----------------------------------------

RST5$5:
        PUSH    PSW
RST5$5A:
        DB      20H ; RIM instruction
        ANI     10H
        JNZ     RST5$5A

        POP     PSW
        EI
        RET
;----------------------------------------

RST6:
        EI
        RET

;----------------------------------------

RST6$5:
        PUSH    PSW
RST6$5A:
        DB      20H ; RIM instruction
        ANI     20H
        JNZ     RST6$5A
```

```
        POP     PSW
        EI
        RET

;-----------------------------------------------

RST7:
        EI
        RET

;-----------------------------------------------

RST7$5:
        EI
        RET

;-----------------------------------------------

PORTTABL:
        DW      0A000H          ; PORT2
        DW      0A001H          ; PORT2A
        DW      0A002H          ; PORT2B
        DW      0A003H          ; PORT2C
        DW      0A004H          ; PORT2L
        DW      0A005H          ; PORT2M
        DW      0B000H          ; PORT3
        DW      0B001H          ; PORT3A
        DW      0B002H          ; PORT3B
        DW      0B003H          ; PORT3C
        DW      0B004H          ; PORT3L
        DW      0B005H          ; PORT3M
NUMPRT  EQU     ($-PORTTABL)/2
;-----------------------------------------------

        DB      0DH,0AH
        DB      'Copyright 1985,86 by New Jersey Machine, Inc.'
        DB      0DH,0AH

CHKSUM  DB      0,0,0

;-----------------------------------------------

%:                                  ****************************
ROMsize EQU $!%:                    Size of code in ROM
;------------------------------------------------------------
; RAM ASSIGNMENTS

        ORG     2000H           ; U2 RAM
STACK   EQU     $+0100H

U2RAM   EQU     $
OUTSAVE DS      NUMPRT

F$SEL1  DS      1               ; FRONT DISP.#1 SELECT - 00 = SELECT
F$SEL2  DS      1               ; FRONT DISP.#2 SELECT - FF = SELECT
R$SEL1  DS      1               ; REAR DISP.#1 SELECT - 00 = SELECT
R$SEL2  DS      1               ; REAR DISP.#2 SELECT - FF = SELECT
SEL     DS      1               ; SYNC.SEL.FLAG - 00 = FRONT, FF = REAR

F$SRINX DS      1               ; INDEX INTO FRONT SHIFT REG.
R$SRINX DS      1               ; INDEX INTO REAR SHIFT REG.

SCL$CNT DS      1

ALRMFLG DS      1               ; FLAG TO TRIGGER TRANSFER ALARM

RAMsize EQU $-U2RAM!%:              Size of variable area in U2 RAM
```

```
;------------------------------------------------

        ORG     3000H               ; U3 RAM

U3RAM   EQU     $
FRNT$SR DS      32                  ; FRONT DISP. SH.REG. RAM
REAR$SR DS      32                  ; REAR DISP. SH.REG. RAM

SRsize EQU $-U3RAM!%:               Size of shift reg's in U3 RAM
%:                                  ****************************

;------------------------------------------------

        END
```

The system operates to effect the automatic control of dispensers from one to the other on the front and back side of containers to be labeled. Viewing these operations from the standpoint of the operator at the control panel, the transfer mode switch 34 selects between independent operation or synchronized operation. In the independent mode, the transfer of operation from the working dispenser to stand-by dispenser operates independently on each side of the machine so that depletion of the label supply on the first dispenser will switch to the second dispenser on the same side without involving the other side of the machine in the back-up mode.

In the synchronized position, the transfer of operation from the working dispenser to the stand-by dispenser of one side operates in synchronism with the dispensers on the opposite side assuming that the non-operating dispensers are in the stand-by mode. Thus, if the first dispenser on one side becomes inoperative, then the second dispensers on both sides will become the operating dispensers.

Should the non-operating dispenser on the opposite side (the side that does not cause the transfer) not be in the stand-by mode, then the transfer will occur on that side as soon as that dispenser is put into the stand-by mode. If the back-up dispensers of the side which calls for the transfer is not in the stand-by mode, the system will go into fail safe to stop the conveyor.

Selector switches 30 and 32 select either the independent or the operating mode of the dispenser on each side. In the independent mode, the dispensers operate independently of each other. Each dispenser can carry a different label. The LOW WEB sensor will stop the dispenser and the conveyor when operating in this mode.

All of the four dispenser controls must be ON to operate the conveyor even if one or more dispensers are not used. To prevent the operation of the unused dispenser, it must be placed in a NOT-READY condition.

In the backup mode, the dispensers operate as a redundant system. Thus, when the first dispenser has its supply of labels depleted, the LOW WEB detector will signal the back-up dispenser to start operating. If the back-up dispenser is not in stand-by, the conveyor system is automatically disabled. During normal operation, the LOW WEB detector on the first dispenser will stop the feeding of labels and initiate the encoder driven timing sequence in the transer controller to allow the already labelled container unit to pass by the second dispenser; then start the second dispenser when the first unlabeled container is in position.

The LOW WEB detector of the second dispenser (when the first dispenser serves as back-up) will initiate a different sequence. It signals the first dispenser to start dispensing immediately and simultaneously initiates the timing sequence which stops the dispensing of the labels of the second dispenser when the already labelled containers have passed the labelling position of the second dispenser.

Depressing manual transfer pushbuttons 26 or 28 will transfer the operation from the operating to the stand-by dispenser at any time.

As previously discussed, the transfer from the upstream to the downstream dispenser considers the fact that a labelled unit is in a position intermediate the two heads. To effect this action, it is noted that in the preferred embodiment, the distance between the peel points is 36" and the incremental encoder pulses represents 0.1875" of conveyor travel. The encoder is driven by the line shaft of the machine so that a train of pulses is generated whenever the conveyor is in motion. The total number of pulses representing the 36" distance is thus 192. The counters 27 and 29 thus delay the transfer until 192 pulses are counted indicative of the passage of a container from the peel point of the first dispenser to just beyond the peel point of the second dispenser.

As modifications to the foregoing may be made without departing from the spirit and scope of my invention, the subject matter for which I desire the protection of a U.S. Patent is set forth in the appended claims.

What is claimed is:

1. Apparatus for controlling transfer between two serially operating labelling dispensers in an automatic labelling machine said control apparatus comprising:

at least two dispensers each generating indications of their status representing conditions of label supply and readiness to operate; and computer means connected to each of said dispensers for controlling the transfer of labelling between them such that said transfer is delayed if said first dispenser is transferring operation to said second dispenser but is without delay if said second dispenser is transferring operation to said first dispenser.

2. In a labelling system which employs four label dispensers, two for a front of a container and two for a back of a container, a control circuit for said dispensers comprising:

means at each dispenser for generating an electrical signal which indicates readiness of the dispenser to operate;

transfer controller means connected to receive said electrical signals and for utilizing same so that any of the dispensers cannot dispense labels unless it indicates its readiness;

indicating means connected to said controller means for presenting visual and audible indications of status of the dispensers and the operation of said controller means;

means at each of the dispensers for generating an electrical signal when a supply of labels for said dispenser is nearly depleted and for connecting said signals to said transfer controller; and means in said controller for initiating a transfer from one dispenser to the other on receipt of an indication that the supply of labels on a dispenser is depleted by commanding the active dispenser to stop dispensing and commanding the inactive dispenser to commence dispensing; the commencement of dispensing by said inactive dispenser being without delay said inactive dispenser is up stream of said active dispenser or delayed, if said inactive dispenser is downstream of said active dispenser.

3. The apparatus of claim 2 further including means connected to said controller for generating an electrical signal representative of a distance between said two dispensers for the front and said two dispensers for the back of a container, a duration of said electrical signal; establishing said delay.

4. An electronic control system for controlling transfer from a first active label dispenser to a second back up dispenser said control system comprising:

means for generating dispenser control signals indicative of a supply of labels thereon and status thereof and for coupling said control signals to a central processing unit;

means in said central processing unit for disabling an active dispenser immediately on occurrence of certain of said control signals and enabling said back up dispenser;

delay means connected to said central processing unit for delaying the enabling of said back up dispenser until labeled containers located in a space between the dispensers have passed beyond said back up dispenser to preclude multiple labeling of these containers, said delay means being rendered inoperative if either labeled containers are precluded from reaching said back up dispenser or said dispensers are in a failure mode.

5. A transfer controller for controlling transfer of operations between active and backup label dispensers said controller comprising computer means connected to said dispensers for receiving and transmitting control signals relating to said dispensers, said computer means including means for generating a control signal indicative of distance between said dispensers and for controlling activation of said backup dispenser to account for containers located beween said dispensers by delaying activation of said backup dispensers to allow already labeled containers to pass beyond said backup dispenser or to activate said backup dispenser without delay so that both dispensers are active for a duration of said signal.

6. The apparatus of claim 5 further including manually operable means connected to said computer means to control the transfer from one dispenser to the other.

7. The apparatus of claim 5 further including container conveyor means connected to said computer means for delivering a supply of unlabeled containers to said dispensers said computer means including means to automatically disable said conveyor if said back up dispenser is unavailable when a transfer is required.

8. The apparatus of claim 7 wherein said computer means includes mode switching means to operate said front and back dispensers independently or synchronously such that in the synchronous mode, transfer to a back up dispenser on one side of the apparatus automatically causes transfer to the back up dispenser on the other side of the apparatus.

9. A control system for controlling the operation and transfer of active to backup labeling dispensers in continuous conveyor driven automatic labeling equipment comprising;

first and second pairs of labeling dispensers for labeling a front and a back of a container, one of the dispensers in each pair being an upstream dispenser and the other being a downstream dispenser; each of said dispensers generating electrical control signals indicative of its readiness to operate and its supply of labels;

first relay means connected between the dispensers of the first pair; second relay means connected between the dispensers of the second pair; and third relay means connected to all of said dispensers and to a conveyor drive; and computer means including transfer counter means for each of said pairs, said computer means connected to said first and second and third relay means for controlling operation of said first and second relay means in accordance with the outputs of said transfer counter means and for controlling operation of said third relay means as a function of operating readiness of said dispensers to control said conveyor.

10. The system of claim 9 further including a plurality of visible indicators connected to said dispensers and to said computer means for visibly indicating status of said dispensers and said system to an operator.

11. The system of claim 9 further including a plurality of manual control means connected to said computer means, said dispensers and said relay means for manually controlling the operation of the system.

12. The system of claim 11 further including audible alarm means connected to said computer means for generating an audible signal on the occurrence of an automatic transfer from one dispenser to another.

13. The system of claim 12 wherein said audible alarm means includes manual reset means for disabling said audible alarm on activation of said reset means.

* * * * *